United States Patent [19]
Tyan et al.

[11] Patent Number: 6,020,041
[45] Date of Patent: *Feb. 1, 2000

[54] PERFORMANCE RECORDING MEDIA FOR RECORDABLE ELEMENT USING GOLD REFLECTOR

[75] Inventors: Yuan-Sheng Tyan, Webster; Tukaram K. Hatwar, Penfield, both of N.Y.

[73] Assignee: Eastman Kodak Company, Rochester, N.Y.

[*] Notice: This patent is subject to a terminal disclaimer.

[21] Appl. No.: 08/991,016

[22] Filed: Dec. 15, 1997

[51] Int. Cl.⁷ .......................................... B32B 3/00
[52] U.S. Cl. ...................... 428/64.1; 428/64.4; 428/64.7; 428/64.8; 428/457; 428/913; 430/270.17; 430/495.945; 369/283; 427/372.2
[58] Field of Search .................... 428/64.1, 64.2, 428/64.4, 64.7, 64.8, 65.1, 457, 913; 430/270.14, 270.16, 270.17, 495.1, 945; 369/283, 288; 427/372.2

[56] References Cited

U.S. PATENT DOCUMENTS

| | | |
|---|---|---|
| 4,940,618 | 7/1990 | Hamada et al. . |
| 5,090,009 | 2/1992 | Hamada et al. . |
| 5,294,471 | 3/1994 | Evans et al. . |
| 5,449,587 | 9/1995 | Itoh et al. . |
| 5,492,744 | 2/1996 | Koike et al. ............................ 428/64.1 |
| 5,604,004 | 2/1997 | Suzkui et al. . |

FOREIGN PATENT DOCUMENTS

| | | |
|---|---|---|
| 0369432 | 11/1989 | European Pat. Off. . |
| 0837461 | 10/1997 | European Pat. Off. . |
| 62-261483 | 11/1987 | Japan . |
| 4-005083 | 1/1992 | Japan . |

*Primary Examiner*—Elizabeth Evans
*Attorney, Agent, or Firm*—Raymond L. Owens

[57] ABSTRACT

An optical disk with improved performance including a transparent substrate; and a recording layer over the substrate and a reflective layer formed of Au over the recording layer and having its property changed by heat treatment for a sufficient time and at a temperature in a range of about 50°–120° C. so as to significantly improve window margin, reflectivity, jitter.

6 Claims, 4 Drawing Sheets

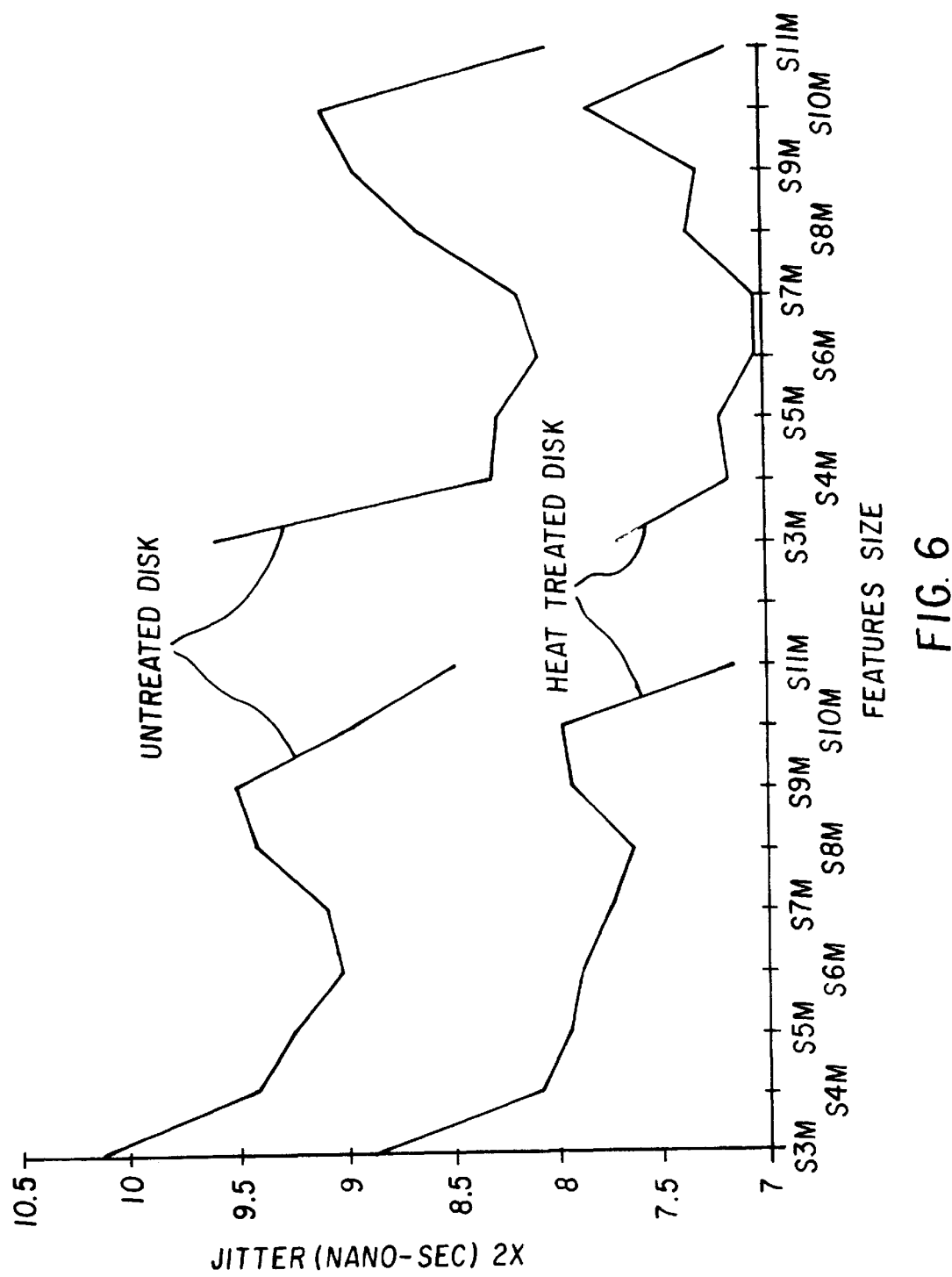

PERFORMANCE RECORDING MEDIA FOR RECORDABLE ELEMENT USING GOLD REFLECTOR

CROSS REFERENCE TO RELATED APPLICATIONS

The present invention is related to commonly assigned U.S. patent application Ser. No. 08/991,028, (77053) filed concurrently herewith entitled "Improved Performance Recording Media For Recordable Element Using Silver Reflector" to Hatwar and Tyan. The disclosure of this related application is incorporated herein by reference.

FIELD OF THE INVENTION

The present invention relates to optical recording elements and methods of forming such elements with improved performance.

BACKGROUND OF THE INVENTION

Optical disks are becoming more and more prevalent for the use of recording information. One form of optical recording disks is called a CD-R or a recordable compact disk. The Photo CD is an example of this CD-R media. Typically, this type of disk has a transparent substrate, a recording layer formed on a substrate, and a reflective layer on the recording layer. The recording layer is essentially a photo absorption material made of mixture of some organic dye materials and is formed by spin coating. The recording materials used for CD-R applications have been described in the U.S. Pat. Nos. 4,940,618; 5,604,004; 5,294,471; European Patent Application 0353393; and Canadian Patent 2,005,520. Commercial useful materials of the type described in these references have stringent requirements. One of these requirement is light stability. Since the Photo CD is a consumer product, it must be capable of withstanding extreme environment. The stability of the disk mainly depends on the nature of the recording layer and the reflector layer and their mutual interaction; and the protective overcoat. The above applications disclose phthalocyanine dye, metallized formazan dye and cyanine dye having excellent light stability. The reflecting layer is usually selected to be gold or a gold alloy because of its nobleness and high reflectivity. The CD-R specifications require that it has a high reflectivity of more than 60% similar to the compact disks.

During recording, writing laser light passes through the plastic substrate and is focused on the dye recording layer which is heated to the decomposition temperature of the dye material. While the surface of the substrate is also heated to near the glass transition temperature of the substrate material. Then a small part of the dye material is decomposed and decomposition gas is generated in the photo-absorption layer. It causes the deformation of the recording layer as well as the dye/substrate interface. In those areas having the deformations or pits, the reflectivity is lower than in those areas not having the deformation which has passed through the recording layer is reflected back by the reflective layer and further enhances the process of forming the mark. Marks are formed either as a pit or as a change in the optical properties of the recording layer. In any event, the combination of some or all of these changes forms marks which can then be read back by the focused read laser beam. The record thus consists of marks of relatively low reflectivity on a background of relatively high reflectivity in relation to the read beam.

Thin layer of gold is normally used as a main reflection material in the reflective layer. It is a noble metal with a very high stability and does not introduce problems into the recording stability. Although successful applications have been made of many organic and inorganic media in optical recording, it is difficult with these media to meet the requirements for many emerging applications. It is desired to have media with special emphasis on the improved performance in window margin, nonlinearity, peak shift, and jitter.

Jitter of a recorded feature is related to its ability of being detected without error during read back. Transitions from nominally identical recorded feature will not be read back precisely at the same time because of the slight variation in feature length and shape and system noise. This gives rise to a spread in detection time. A detection time window can read all these features if the distribution is so narrow as to lie completely within the time window. On the other hand, if the distribution is broad such that some of the transitions occur outside the window, they will result in a decoding error. Jitter is a measure of the overall noise and is the square root of the variance of the distribution of detection time commonly modeled as a Gaussian curve. The distribution of detection time may not be exactly centered in the timing window which will increase the probability of a decoding error even for a narrow distribution. The window margin (WM) is a derived parameter involving jitters and peak shifts of all recorded features. The lower the jitters and peak shifts, the higher is the Wm. The Wm. can be viewed as a figure of merit in that the discs with higher Wm. has a greater probability of successful read back than the one with lower Wm. Also the disc with higher Wm. is expected to be read back by a wider variety of readers than the one with lower Wm. that is otherwise similar.

SUMMARY OF THE INVENTION

Therefore it is an object of this invention to provide recording media with markedly improved properties, particularly with respect to WM, jitter, nonlinearity, and reflectivity.

This object is achieved by a recordable element with improved performance, comprising:

a) a transparent substrate; and b) a recording layer over the substrate and a reflective layer formed of Au over the recording layer and having its property changed by heat treatment for a sufficient time and at a temperature in a range of about 50°–120° C. so as to significantly improve window margin, reflectivity, jitter, and stability.

ADVANTAGES

The media produced in accordance with the present invention have improved performance in, window margin, jitter, nonlinearity and reflectivity.

BRIEF DESCRIPTION OF THE DRAWINGS

FIG. 6 shows comparison of jitter of the two disks, untreated and heat treated disk (at 100° C. for six hours) for various size feature of mark and land.

DETAILED DESCRIPTION OF THE INVENTION

Figure 1:
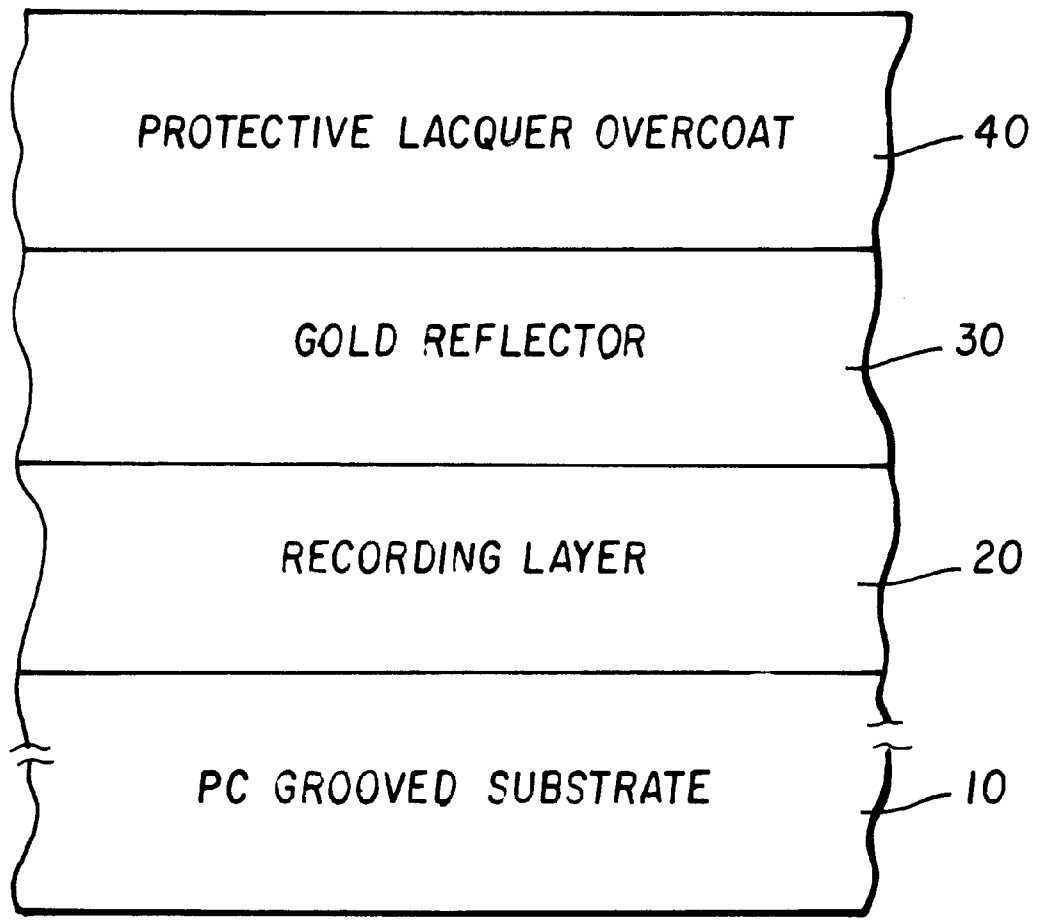
FIG. 1 is a schematic representation, in cross-section, of the CD-R disk.

FIG. 1 is a structure of a writable storage disk. It includes a substrate 10 which is made of polycarbonate and a dye recording layer 20. The recording layer is deposited using a spin coating technique. On the recording layer 20 is provided a reflecting layer 30 which is formed of gold. A UV-cured protective lacquer layer 40 is overccoated on the gold reflecting layer.

Thin films of gold reflector were deposited by sputter deposition using DC magnetron gun in Ar gas. About 60–80 nm gold thickness was deposited on the dye recording layer. Then the UV-curable lacquer overcoat was spin coated on the reflecting layer. These disks were tested for reflectivity ($R_{top}$), window margin (WM), jitters and other relevant parameters using Kodak PCD 600 6x writer/reader at 2.4 m/sec. Here, $R_{top}$ is reflectivity measured by PCD-600 as the reflectivity of the unwritten land. $R_{top}$ is substantially lower than the true reflectivity because of birefringence, groove structure of the disk and the influence of the neighboring marks and tracks.

It has been found, quite unexpectedly, that the performance of the disk using Au reflector dramatically improved when the disks were written after they were subjected to a heat treatment. It has been found, as will be shown below, that the discs made using the present invention exhibit improvement, among other parameters, in WM, jitter and $R_{top}$.

One of the important features of the invention is the heat treatment of recording elements. Heat treatment can be accomplished by any number of well known techniques. For example, a plurality of discs can be mounted on a spindle, and that spindle and discs can be placed in an air oven. The temperature of the air oven is preselected and the discs are heat treated for a predetermined period of time. Thereafter, the spindle and discs are removed from the oven and are cooled in air until they reach room temperature. Benefits are generally improved at more elevated temperatures and longer periods of time. For example, it has been found that, at temperature of 70° C. or greater for time periods of six hours or more, significant improvements are made. The temperature and the time of heat treating are limited by the plasterizing of polycarbonate substrates so that the geometry of the disc and the groove structure in the disc, are not significantly altered.

The discs were tested using an automated tester including a Kodak PCD 600 writer/reader. The recording and read back were performed at the constant linear velocity of 2.4 m/s. The following parameters were determined: reflectivity ($R_{top}$), optimum recording power (ORP), written contrasts; and nonlinearity NL (maximum difference of peak shifts among all features) Wm and jitter. In the CD recording scheme there are 18 features—nine of them are made by laser exposures and are called marks and the rest nine are features created by not exposing to laser beam and are called lands. Their exposure times are expressed in mulitples of detection window width (115.7 ns). The 3T, 4T, 5T . . . 11T marks are made by exposing to laser beam for 3 detection widths, 4 detection widths, 5 detection widths, and so on. The marks are correspondingly designated as 3M, 4M, 5M . . . 11M with 3M being the smallest and 11M being the largest of the marks. Similarly there are nine lands designed as –3L, 4L, 5L . . . 11L. S3M, S4M, etc. are the jitters of the corresponding marks. S3L, S4L, etc. are the jitters of the corresponding lands between marks. The contrasts ($C_3$ and $C_{11}$) and jitters (S3M, S11M and S3L, S11L) presented in the examples are of the smallest and largest features.

A set of 24 discs were prepared in quick sequence using 80 nm Au layer on the dye recording layer. Then the UV curable lacquer overcoat was spin coated on the Au reflector. The performance of these disks was measured by writing/reading a narrow 2 mm band around 45 mm disk radius. A typical disk has a performance as given in column 2 of Table 1.

TABLE 1

COMPARISON OF THE DISK PERFORMANCE BEFORE AND AFTER HEAT TREATMENT

| Recording Parameter | Performance as deposited | Performance after heat treatment |
|---|---|---|
| ORP(mW) | 6.9 | 6.9 |
| Rtop(%) | 58.4 | 60.1 |
| NL(ns) | 36 | 33.9 |
| S3M(ns) | 11 | 9.1 |
| S3L(ns) | 10.5 | 8.1 |
| S11M(ns) | 10.1 | 7.6 |
| S11L(ns) | 9.8 | 7.8 |
| WM(%) | 36 | 45 |

The above control disk then was subjected to treatment consisting of heating to 100° C. in air oven for six hours followed by normal cooling in air. The disk performance was then determined by writing a new band adjacent to the original band. The disk performance after the heat treatment is included in column 3 of Table 1.

It is clear that the heat treated disk has much better performance. Thus, because of the modification effected by the present invention, there occur significant improvements in Wm, $R_{top}$, contrasts, NL, and jitters.

The improvement in disk performance is a function of heating temperature and time. Longer time is required if the heat treatment is done at a low temperature, while shorter time is required if the heat treatment is done at high temperature. The temperature and the time of heat treating are limited by the plasterizing of polycarbonate substrates so that the geometry of the disc and the groove structure in the disc, are not significantly altered. The temperature can be selected in the range of 50° to 120° C. and the heat treatment time can be selected between 1 to 24 hours.

Figure 2:
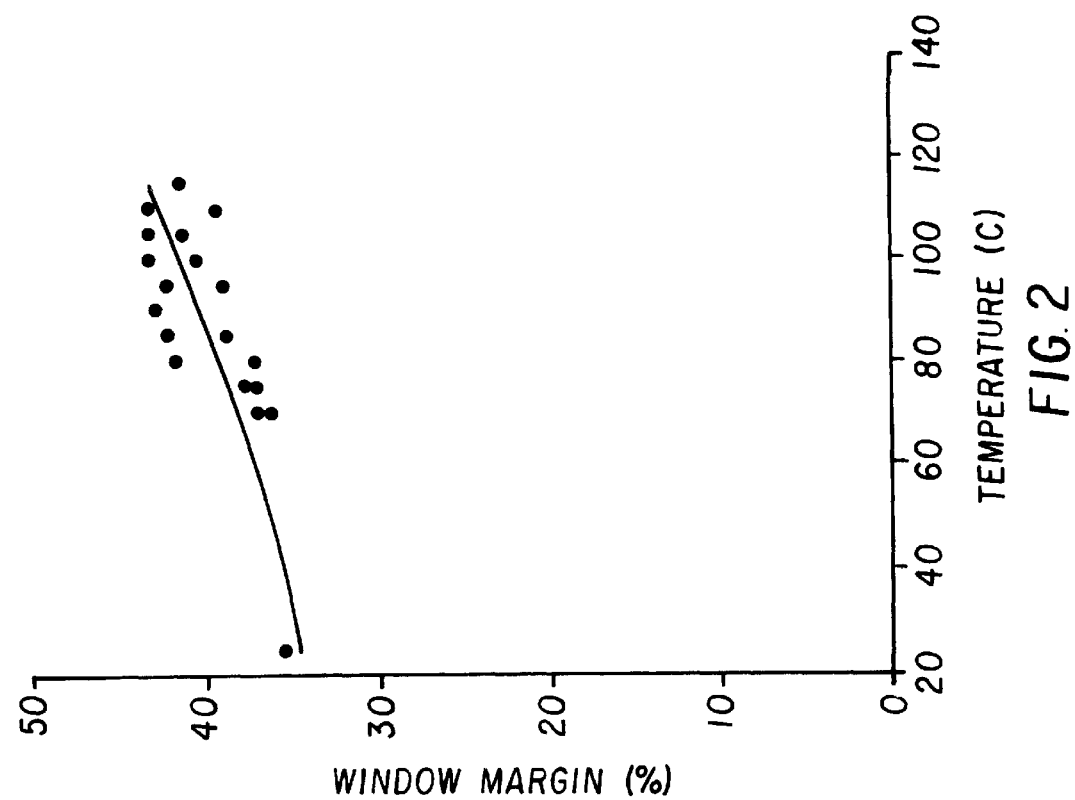
FIG. 2 show the improvement in the widow margin of the disk with Au reflector as a function of heat treatment temperature. Disks were treated for two hours in dry air at particular temperature.

FIG. 2 show the improvement in the widow margin of the disk with Au reflector as a function of heat treatment temperature. Disks were treated for two hours in dry air oven at particular temperature. It is evident that because of the heat treatment there occur significant improvements window margin. Similarly, improvement in $R_{top}$, contrasts, NL, and jitters were observed.

Figure 3:
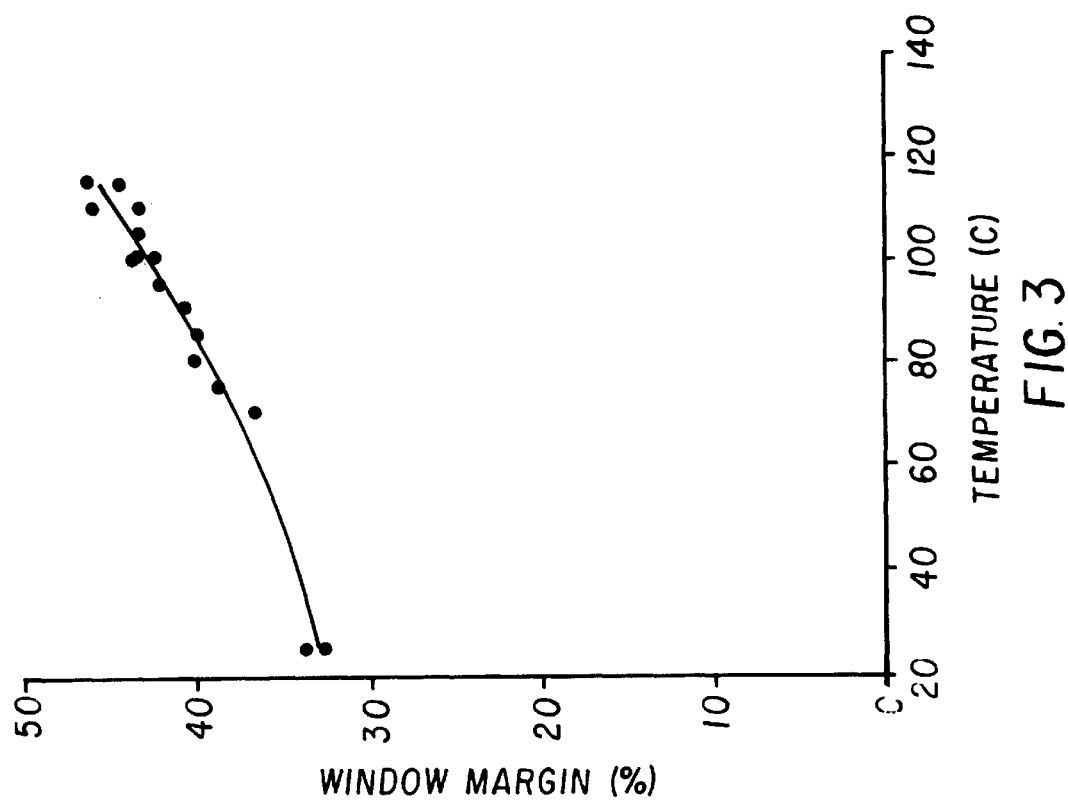
FIG. 3 shows the WM as a function of temperature for the disks heat treated for six hours in air.

FIG. 3 shows the WM as a function of temperature for the disks heat treated for six hours in air.

FIG. 3 shows WM as a function of temperature for the disks heat treated for six hours in air. Higher WM were achieved using heat treatment of six hours as compared to two hours. Also higher performance was achieved at much lower temperature. Maximum performance was observed in the temperature range of 80°–110° C. Similar improvement in $R_{top}$, NL, and jitters were obtained by following the present invention.

Figure 4:
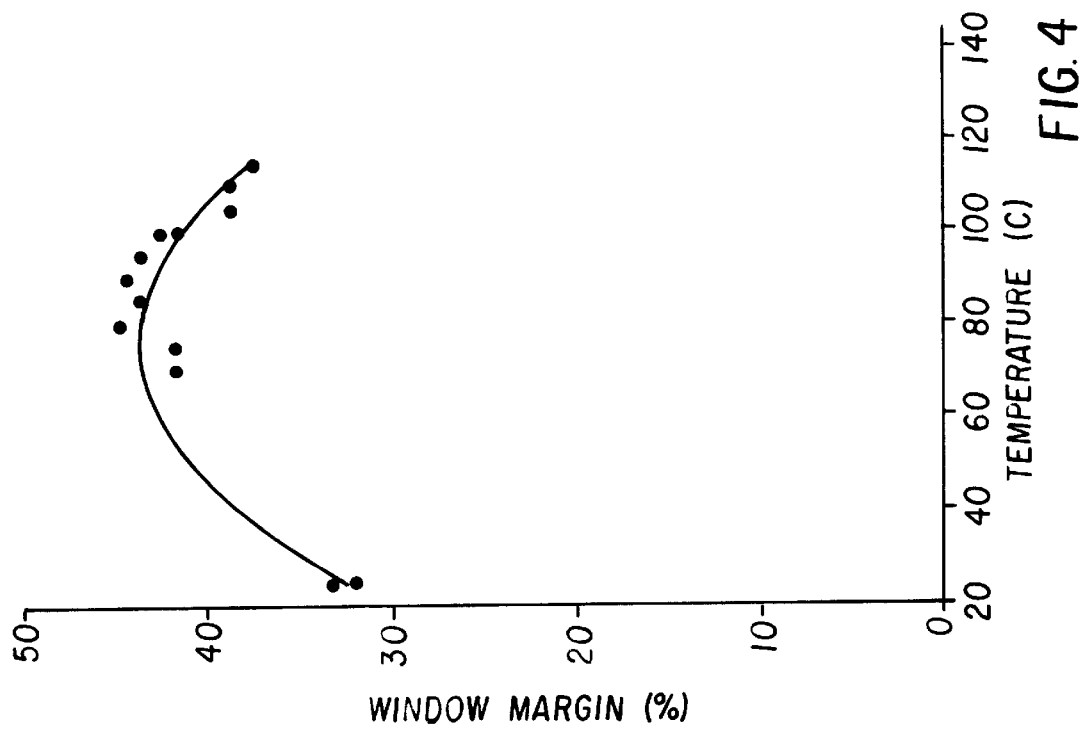
FIG. 4 shows WM as a function of temperature for the disks heat treated for sixteen hours in air.

FIG. 4 shows WM as a function of temperature for the disks heat treated for sixteen hours in air. Here also higher performance was obtained at much lower temperature of 60–70° C. However, WM degrades when the temperature is higher than 100° C. possibly because of distortion of polycarbonate substrates.

Figure 5:
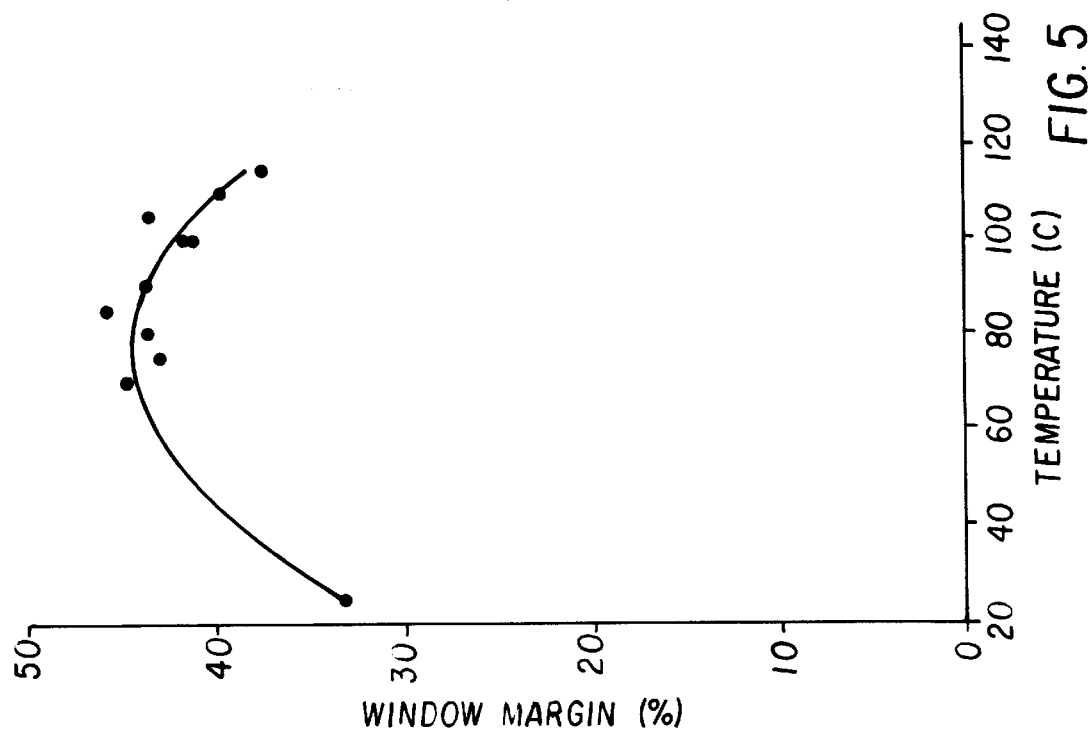
FIG. 5 shows WM as a function of temperature for the disks heat treated for 72 hours in air.

FIG. 5 shows WM as a function of temperature for the disks heat treated for 72 hours in air. In this case also maximum improvement in the WM was achieved when the heat treatment temperature was about 70°–80° C., after that WM starts decreasing again, possibly due to geometrical distortion of the substrate. Thus, maximum improvement in disk performance can be achieved by optimizing the temperature and time of the heat treatment.

FIG. 6 shows comparison of jitters of various features before and after heat treatment. Performance of the disk was measured just after the deposition. The jitters of mark and land are shown in FIG. 6. Then it was subjected to treatment of heating to 100° C. in air oven for six hours followed by normal cooling in air. The performance of this disks was then determined by writing/reading another band adjacent to the original band. The jitters of this heat treated disk are included in FIG. 6. It is clear that because of the modification effected by the present invention there occurs significant decrease in the jitters of mark and land.

Heat treatment of the dye layer before overcoating the disk with Au reflector was also studied as a function of temperature. A set of 24 disks with dye recording layer only were heat treated for two hours at temperatures 50°–120° C. All the disks including untreated and dye treated were then coated with 80 nm Au reflector followed by an UV-cured lacquer overcoat. These disks were then tested for performance by writing/reading a 2 mm band at 45 mm radius. Improvement in the performance such as WM, jitter and NL was achieved due to heat treatment of the dye layer, but it was lower than that obtained in FIG. 2 where full structure disk with Au layer was heat treated. Similarly disks with recording dye alone were heat treated for four and six hours in the temperature range 70°–120° C. Their performance was measured after overcoating with Au reflector and UV-cured lacquer. Again improvement in the performance such as WM, jitter and NL was achieved due to heat treatment of the dye, but it was lower than that obtained in FIGS. 3, 4, or 5 where a full structure disk with the Au reflector were subjected to heat treatment. These dye treated disks were subjected to an additional heat treatment in the temperature range of 70°–120° C. for six hour. Their performance was measured by writing/reading a new band adjacent to the original band. In this case maximum improvement in the WM was similar to that obtained in FIGS. 2 and 3.

Thus the recording elements made in accordance with the present invention have significantly superior performance with respect to WM, $R_{top}$, NL, and jitters.

The invention has been described in detail with particular reference to certain preferred embodiments thereof, but it will be understood that variations and modifications can be effected within the spirit and scope of the invention.

PARTS LIST 10 substrate
20 dye recording layer
30 reflecting layer
40 UV-curable lacquer protective overcoat

What is claimed is:

1. A method of making an optical disk comprising the steps of:
    a) providing a transparent grooved substrate;
    b) forming a recording layer over the substrate and a reflective layer formed of Au over the recording layer; and
    c) heat treating the optical disk at a temperature range of about 50°–120° C. for a time between 1 to 24 hours to cause a substantial improvement in performance.

2. The method of claim 1 wherein the recording layer includes a photosensitive material selected so as to form a mark when illuminated by laser light at a particular wavelength.

3. The method of claim 1 wherein the photosensitive material is a phthalocyanine dye.

4. The method of claim 1 wherein the photosensitive material is a formazan metal complex dye dye.

5. The method of claim 1 further including an overcoat UV curable lacquer protective layer.

6. The method of claim 1 wherein the substrate includes a polycarbonate material.

* * * * *